Feb. 26, 1963 F. T. BACKERS ETAL 3,079,469

MAGNETIC RECORDING

Filed March 11, 1959

INVENTOR
FRANCISCUS THEODORUS BACKERS
JOHANNES HENDRIK WESSELS

BY
Frank R. Jeifari
AGENT

United States Patent Office 3,079,469
Patented Feb. 26, 1963

3,079,469
MAGNETIC RECORDING

Franciscus Theodorus Backers and Johannes Hendrik Wessels, both of Eindhoven, Netherlands, assignors to North American Philips Company, Inc., New York, N.Y., a corporation of Delaware Filed Mar. 11, 1959, Ser. No. 798,669
Claims priority, application Netherlands Mar. 28, 1958
1 Claim. (Cl. 179—100.2)

This invention relates to a method of recording high-frequency signals, more particularly television signals, on a tape which is driven in the direction of its length, the recording being done by means of a number of magnetic heads arranged on a support which rotates in the plane of the tape. This method of recording may be carried out by means of an apparatus as described in U.S. patent specification 2,772,328. The tape may be subject to transverse shrinkage after recording, the shrinkage being such that the shortest arc length of each recorded line of the non-shrunk tape with a normal width of the track is no longer present in the same line on the shrunk tape.

In carrying out this method, in which circular tracks are recorded transversely on the tape which is driven comparatively slowly, it was found that the arc length of the tracks may be altered due to the shrinkage of the tape subsequent to recording so that during reproduction there is appreciable misalignment between the recorded signals and the magnetic heads.

By the use of the method in accordance with the present invention the above mentioned shrinkage can be compensated for in a simple manner. For this purpose, in the method in accordance with the invention the size of the recording gaps of the magnetic heads, measured in the direction of length of the tape, is made such that the shortest arc length on the original, unshrunk tape is still present on the shrunk tape. This means that in effect the recording track is made broader than is usual.

In order that, in reproduction, each line is exactly aligned with the next line, each line must have a certain arc length since, viewed in the direction of length of the tape, it is bounded by parts of the circumferences of two concentric circles. If a tape has shrunk subsequently to recording, there is a likelihood that on the shrunk tape there will no longer be any arc length of the determined length required for the said line to be correctly aligned with the next line.

If, however, allowance is made for this likelihood and use made of a recording gap the width of which is made larger than the usual one, there will always, even with shrinkage of the tape, be an arc length in the magnetic track of the length which will give satisfactory reproduction.

Figure 1:
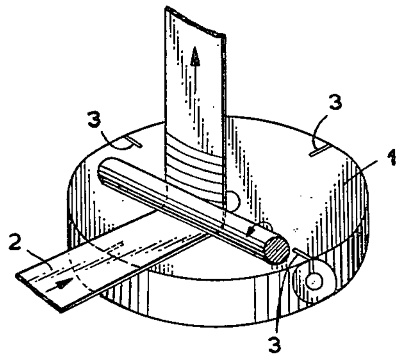
Figure 2:
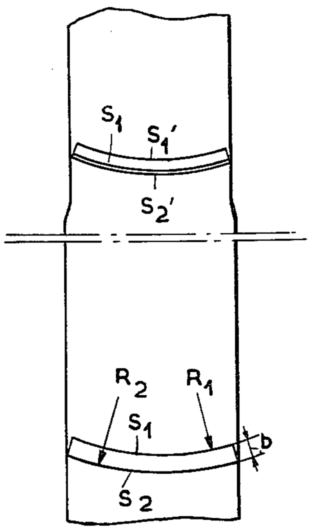

In order that the invention may readily be carried out, it will now be described, by way of example, with reference to the accompanying drawings, in which FIG. 1 shows an apparatus by means of which the method in accordance with the invention can be carried out, and FIG. 2 shows a tape on which a recording in accordance with this method is made, in the non-shrunk and shrunk conditions of the tape.

In FIG. 1, reference numeral 1 denotes a wheel adapted to rotate in the plane of a magnetic tape 2. Along the circumference of the wheel there are arranged four magnetic heads having gaps denoted by reference numeral 3. By means of these gaps magnetic tracks are recorded on the tape, the width $b$ of these gaps being bounded by the circumferences of two concentric circles having radii $R_1$ and $R_2$ respectively (FIG. 2). A line on the tape may be considered as built up from arcs of circles traced with increasing radii. The radius $R_1$ is associated with an arc length $s_1$ and the radius $R_2$ with an arc length $s_2$, where $R_1<R_2$ and $s_1<s_2$. Now it may happen that after recording the length $s_1$ is no longer present in the same line on the shrunk tape. By the use of the method in accordance with the invention, whereby a recording head is used having a gap the width of which is larger than that of the reproducing head, this disadvantage can be obviated so that on the shrunk tape the arc length $s_1$ is still present in the same line, as is shown in the upper part of FIG. 2, in which $s'_1$ and $s'_2$ represent the arc lengths $s_1$ and $s_2$ after shrinkage.

While the invention has been described in connection with a specific embodiment and application, other modifications thereof will be readily apparent to those skilled in the art without departing from the spirit and scope of the invention as defined in the appended claim.

What is claimed is:

In a system for recording and reproducing high frequency signals on a magnetic tape subject to shrinkage in the transverse direction, the combination of a magnetic tape moving in its longitudinal direction, a plurality of magnetic recording heads arranged on a wheel rotating in the plane of said tape for recording high frequency signals in arcuate transverse record tracks thereon, said heads including gaps having widths measured along the longitudinal direction of the tape when a head is in co-acting relationship with the tape, the predetermined widths of said gaps being greater than the predetermined widths of the gaps in magnetic reproducing heads for reproducing said signals, the width of each recorded track being greater than the gap width of an associated reproducing head.

References Cited in the file of this patent

UNITED STATES PATENTS

| | | |
|---|---|---|
| 2,419,195 | Begun | Apr. 22, 1947 |
| 2,736,776 | Camras | Feb. 28, 1956 |
| 2,772,328 | Lyon | Nov. 27, 1956 |

OTHER REFERENCES

Elements of Magnetic Tape Recording, 1957, Prentice Hall; TK5981 H33; pp. 56–57.